Figure 1:
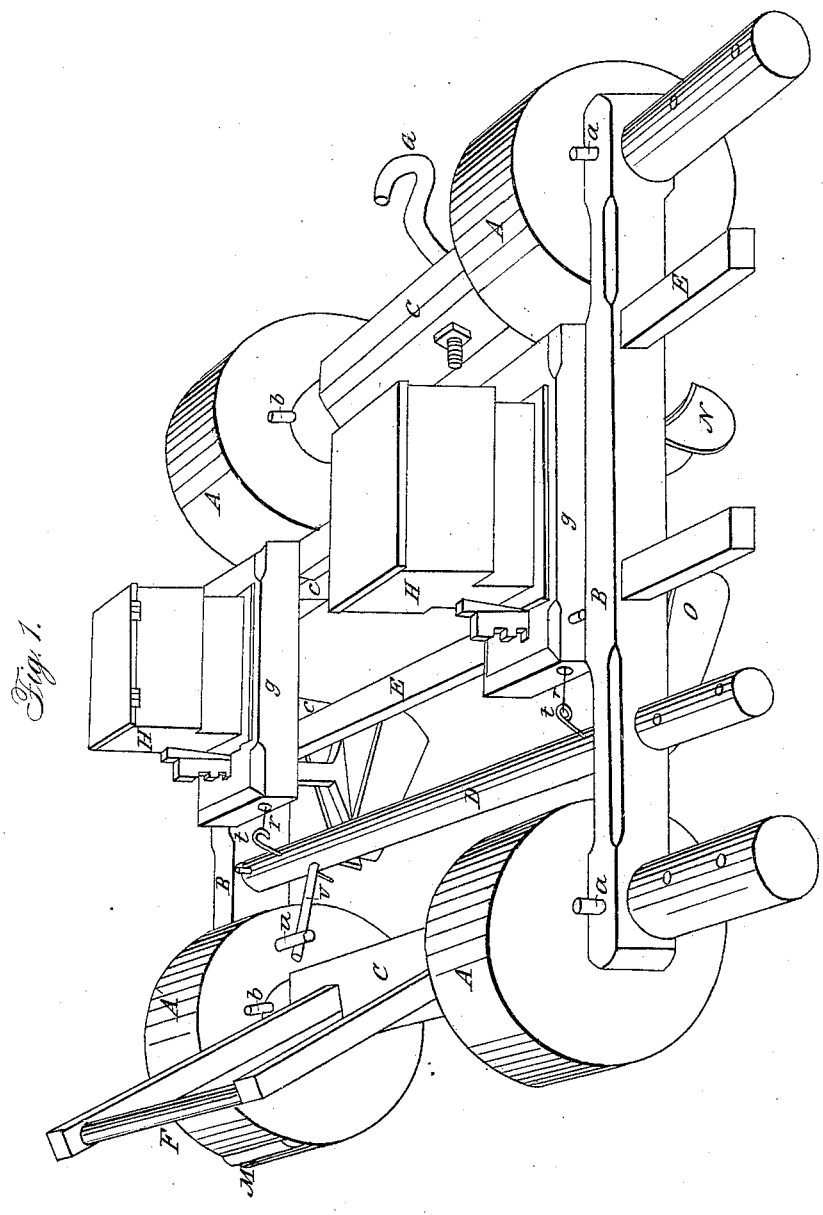

D. S. ROCKWELL.
Corn Planter.

No. 1,097.

2 Sheets—Sheet 1.

Patented Mar. 12, 1839.

D. S. Rockwell.
Corn Planter.
N°. 1,097.  Patented Mar. 12, 1839.
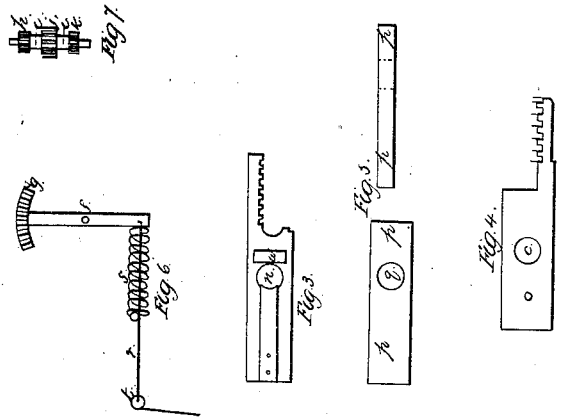
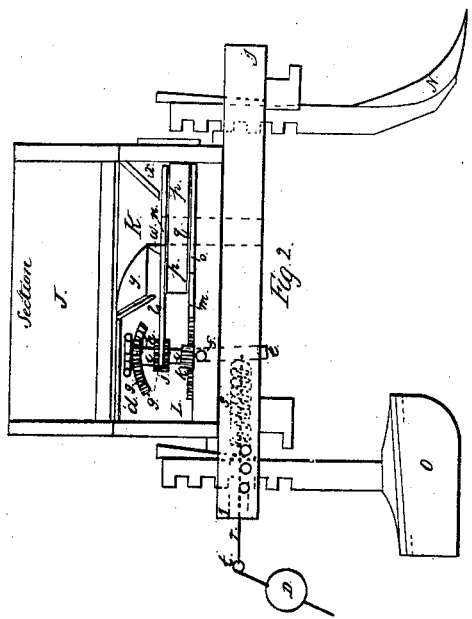

UNITED STATES PATENT OFFICE.

DAVID S. ROCKWELL, OF NEW CANAAN, CONNECTICUT.

IMPROVEMENT IN MACHINES FOR PLANTING CORN AND OTHER SEEDS.

Specification forming part of Letters Patent No. 1,097, dated March 12, 1839.

*To all whom it may concern:*

Be it known that I, DAVID S. ROCKWELL, of New Canaan, in the county of Fairfield and State of Connecticut, have invented a new and useful Machine for Planting Corn and other Seeds; and I do hereby declare that the following is a full and exact description thereof.

Figure 1 in the accompanying drawings is a representation of the whole machine in perspective. A A are four wheels, which may be sixteen inches in diameter and five inches broad, but their size may be varied for the purpose of varying the distance apart at which the seeds are to be planted; and for the purpose of regulating the distance between the rows the sides of the frame, B B, and the wheels A A may be placed nearer together or farther apart, as may be necessary. To effect this the axles C C, the round rod or roller D, and the transverse pieces E E pass through openings adapted to them in the side pieces, B B, and are of sufficient length to allow the side pieces to be placed as far apart as may be required. The side pieces are held in their places on the axles by check-pins $a$ $a$, and the wheels also are checked by pins passing through the axles close to their inner sides, as at $b$ $b$. The wheels A A revolve freely on the axles, the outer ends of which are made cylindrical for that purpose. F is a handle by which to direct the machine, the horse being attached at G. H H are two boxes, which, with their appurtenances, I call "droppers." These constitute an essential feature of the machine, their office being to contain the seed to be planted, and to drop it in such quantities and at such distances as may be desired. The bases or bottoms I I of these boxes rest upon the transverse pieces E E and against the side pieces, B B, being confined to the pieces E E by the cleats $c$ $c$ or in any other convenient way admitting of their being shifted with the other parts.

Fig. 2 shows the interior of the dropper, one side of it being removed for that purpose, there being appended to it some other parts, to be presently described. The upper part, J, constitutes the hopper, into which the corn or other grain is to be put, and from which it is to pass through the apparatus of slides and partitions by which the dropping is to be regulated, which are situated at the end K, the end L containing the apparatus for giving motion to the slides, over which there is a cover, $d$, to prevent the grain from passing in. To operate the slides there is a trigger, $e$, which vibrates upon a fulcrum at $f$, and which at its upper end carries a toothed segment, $g$, which meshes into a pinion, $h$, on a vertical shaft, $i$ $i$, turning in suitable bearings. This shaft carries two other pinions, $j$ and $k$, which are to work the slides, and are for this purpose made to mesh into racks on said slides on opposite sides of said pinions. These slides are shown separately at Figs. 3 and 4, which are respectively the upper and lower slides, and are marked $l$ and $m$. The edges of these slides work in grooves in the box of the dropper. They have holes through them, as shown at $n$ $o$, which are ordinarily about half an inch in diameter; but this may be varied at pleasure. When in their places they have between them a stationary partition, $p$, having a hole, $q$, through it, as shown separately at Fig. 5. The ordinary thickness of this partition is about half an inch, as this will in most cases afford sufficient space to contain the number of grains to be dropped at once; but by increasing the thickness of this partition or the diameters of the holes the quantity may be increased at pleasure.

It will be seen that when the slides $n$ and $o$, Figs. 3, 2, and 4, are in their places, with their racks on opposite sides of the pinions $j$ and $k$, if motion be given to the segment $g$ they will be caused to move in opposite directions, and the openings through them will alternately coincide with that in the partition.

To move the trigger $e$ a cord or wire, $r$, is attached to it and passes out through a hole made for that purpose along the base I I, below the dropper. The spiral spring $s$ serves to press the trigger back, and to admit of its being drawn forward by the rod $r$. This rod, cord, or wire is attached at its outer end to a pin, $t$, on the roller D, Fig. 1. This roller is turned by the contact of the pin $u$ on the wheel with the pin $v$ on the roller, as will be seen in the drawings, and by this action the dropping will be effected. The distance between each planting will be about four feet, provided the wheels A be sixteen inches in diameter, and by varying the size of these the distance will be varied.

Fig. 6 shows the trigger, segment, &c., detached, and Fig. 7 the shaft $i$ $i$ with its pinions.

On the upper slide I place a projecting piece, w, to carry the grain forward and insure the filling of the hole in the partition. x is a spring which as the slide is drawn back will give way should a grain of corn, &c., be caught between the edge of the slide and the hole in the partition, the slide being cut away below it, and thus admitting of this action.

On the wheel A', Fig. 1, I place a cleat or strip crossing its periphery, as shown at M. This is for the purpose of making an indentation on the ground as it revolves, and it serves the purpose of enabling the person using the machine to regulate it so that the rows shall coincide when the machine is turned round at the end of each row.

To open the ground for the reception of the seed I employ shares, N, which are affixed to the base I of the droppers, and may be adjusted so as to regulate the depth to which they shall descend, and behind these I employ coverers, O, similarly affixed to the base I.

The piece y in the drawings, Fig. 2, which is placed in and crosses the hopper above the slide l, serves to conduct the corn more directly toward the opening in that slide, and thus co-operates with the projecting piece w, while at the same time it takes off the pressure of the corn from the slide. To render the action of the slides the more perfect I generally make the pinion j in the dropper somewhat larger than the pinion k, thus giving to its slide a more rapid motion, thus giving greater space between the coincidence of the openings in the upper and lower slides with that of the partition.

Having thus fully described the construction of my machine for planting corn or other grain and explained the manner in which the same operates, what I claim as my invention therein, and desire to have secured by Letters Patent, is—

1. The manner in which I construct the part which I have denominated the "dropper," consisting of the slides placed above and below the partition, and operated upon by means of a toothed segment and pinions, arranged substantially in the manner set forth, and set in motion by one of the bearing-wheels of the machine.

2. In combination with droppers constructed as above, the manner of adjusting the machine to the required distance of the rows from each other by the sliding of the transverse pieces upon which the droppers rest and also of the axles of the wheels in the side pieces of the frame, in the manner set forth.

DAVID S. ROCKWELL.

Witnesses:
WATTS COMSTOCK,
JOSEPH SCOFIELD.